United States Patent
Tabuchi

(10) Patent No.: US 10,125,238 B2
(45) Date of Patent: Nov. 13, 2018

(54) POLYTETRAFLUOROETHYLENE RESIN COMPOSITION

(71) Applicant: NOK CORPORATION, Tokyo (JP)

(72) Inventor: Yuhei Tabuchi, Ibaraki (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 15/440,784

(22) Filed: Feb. 23, 2017

(65) Prior Publication Data

US 2017/0253715 A1    Sep. 7, 2017

(30) Foreign Application Priority Data

Mar. 3, 2016 (JP) .................................. 2016-041340

(51) Int. Cl.
| | |
|---|---|
| *C08L 27/18* | (2006.01) |
| *C08K 3/04* | (2006.01) |
| *C08K 3/105* | (2018.01) |
| *C08K 3/11* | (2018.01) |
| *C08K 3/08* | (2006.01) |
| *C08K 11/00* | (2006.01) |
| *F16J 15/10* | (2006.01) |
| *C08K 3/013* | (2018.01) |
| *C08F 14/26* | (2006.01) |

(52) U.S. Cl.
CPC ................ *C08K 3/08* (2013.01); *C08K 3/013* (2018.01); *C08K 3/04* (2013.01); *C08K 11/005* (2013.01); *F16J 15/102* (2013.01); *C08F 14/26* (2013.01); *C08K 3/105* (2018.01); *C08K 2003/085* (2013.01); *C08K 2201/003* (2013.01); *C08K 2201/005* (2013.01); *C08K 2201/016* (2013.01); *C08L 27/18* (2013.01); *C08L 2666/54* (2013.01)

(58) Field of Classification Search
None
See application file for complete search history.

(56) References Cited

U.S. PATENT DOCUMENTS

| | | | | |
|---|---|---|---|---|
| 5,922,453 | A * | 7/1999 | Horn, III | ................ C08K 3/22 |
| | | | | 428/323 |
| 2015/0176121 | A1* | 6/2015 | Fukasawa | ............ F16J 15/3284 |
| | | | | 277/500 |

FOREIGN PATENT DOCUMENTS

| | | | | |
|---|---|---|---|---|
| JP | 2000-1589 A | | 1/2000 | |
| WO | WO-2014017376 A1 * | | 1/2014 | ........... F16J 15/3284 |

OTHER PUBLICATIONS

Aetna Plastics, "DuPont Teflon PTFE Specifications". Retrieved from web.archive.org on Feb. 2, 2018. Archived on Jul. 21, 2013. (Year: 2013).*
American Petroleum Institute, "Robust Summary of Information on Petroleum Coke". Aug. 30, 2000. (Year: 2000).*
Engineering Tool Box webpage "Metals and Alloys—Densities". Retrieved from www.engineeringtoolbox.com on Feb. 2, 2018. (Year: 2018).*

* cited by examiner

*Primary Examiner* — Richard A Huhn
(74) *Attorney, Agent, or Firm* — Brinks Gilson & Lione

(57) ABSTRACT

A polytetrafluoroethylene resin composition comprising 67 to 75 volume %, preferably 69 to 72 volume %, of a polytetrafluoroethylene resin and 33 to 25 volume %, preferably 31 to 28 volume %, of a filler having an average particle diameter of 45 to 80 μm, preferably 50 to 75 μm. The seal ring obtained from the polytetrafluoroethylene resin composition of the present invention can prevent the cut cross-sections of the seal ring abutting portion from being pressed by oil pressure and fixing to each other. Therefore, the seal ring is effectively used as an oil seal ring used as a sealing material applied to vehicle CVTs and power steering devices.

8 Claims, No Drawings

POLYTETRAFLUOROETHYLENE RESIN COMPOSITION

RELATED APPLICATION

This application claims priority under 35 U.S.C. § 119 to Japanese Patent Application No. 2016-041340, filed Mar. 3, 2016, the entire disclosure of which is hereby expressly incorporated by reference.

TECHNICAL FIELD

The present invention relates to a polytetrafluoroethylene resin composition. More particularly, the present invention relates to a polytetrafluoroethylene resin composition that is effectively used as a molding material of an oil seal ring for vehicle CVTs, etc.

BACKGROUND ART

Pressure resistance is required for oil seal rings used in vehicle CVTs (continuously variable transmissions: stepless transmissions), power steering devices, etc. In order to satisfy the pressure resistance, for example, a modified polytetrafluoroethylene resin containing a polyfluoroalkyl group filled with glass fiber, etc., which originally has excellent pressure resistance, is used (see Patent Document 1). In this case, however, aggression against a mating metal used in a housing, etc., tends to be large.

Moreover, in order to facilitate the incorporation of a seal ring into an apparatus, one portion of the seal ring on its circumference is generally cut to provide an abutting portion. However, when the cut cross-sections of this portion are pressed by oil pressure and fixed to each other, the seal ring cannot be subsequently attached to the housing side. Therefore, it is difficult to seal oil when oil pressure is applied again, and the oil flows through the seal ring. The oil flowing through the seal ring causes defects, for example, the engine does not start.

PRIOR ART DOCUMENT

Patent Document

Patent Document 1: JP-A-2000-1589

OUTLINE OF THE INVENTION

Problem to be Solved by the Invention

An object of the present invention is to provide a polytetrafluoroethylene resin composition that can provide a seal ring capable of preventing the cut cross-sections of the seal ring abutting portion from being pressed by oil pressure and fixing to each other.

Means for Solving the Problem

The above object of the present invention can be achieved by a polytetrafluoroethylene resin composition comprising 67 to 75 volume % of a polytetrafluoroethylene resin and 33 to 25 volume % of a filler having an average particle diameter of 45 to 80 μm.

Effect of the Invention

A seal ring obtained from the polytetrafluoroethylene resin composition of the present invention can prevent the cut cross-sections of the seal ring abutting portion from being pressed by oil pressure and fixing to each other. Therefore, the seal ring is effectively used as an oil seal ring used as a sealing material applied to vehicle CVTs and power steering devices.

EMBODIMENTS FOR CARRYING OUT THE INVENTION

The polytetrafluoroethylene resin can be either a homopolymer of tetrafluoroethylene, or a copolymer modified with 2 wt % or less of a copolymerizable monomer, such as a side chain group having a perfluoroalkyl ether group, a polyfluoroalkyl group, or other fluoroalkyl groups.

The polytetrafluoroethylene resin is used at a ratio of 67 to 75 volume %, preferably 69 to 72 volume %, in a composition comprising the polytetrafluoroethylene resin and a filler having a specific particle diameter. If the amount of polytetrafluoroethylene resin used is less than this range, the original characteristics of the polytetrafluoroethylene resin are difficult to be developed.

The filler can be a coke powder, a bronze powder, glass beads, carbon beads, or the like having an average particle diameter (as measured by a laser diffraction particle size distribution analyzer) of 45 to 80 μm, preferably 50 to 75 μm. The filler is preferably a coke powder or a bronze powder. Such a filler is used at a ratio of 33 to 25 volume %, preferably 31 to 28 volume %, in the composition. If a filler having an average particle diameter outside the above range is used, or if the amount of filler used is less than the above range, desired fixing prevention effects cannot be obtained. In contrast, if the amount of filler used is greater than the above range, aggression against the mating material increases, and the function as a sealing material is lost. As the bronze powder, not only spherical bronze, but also amorphous bronze and porous bronze, can be used. Volume % is converted from % by weight in consideration of specific gravity.

Moreover, a filler having an aspect ratio in the vicinity of 1, for example, a filler in an almost spherical shape having an aspect ratio of 1 to 2, is used. A filler having a high aspect ratio, such as fibrous filler, can impart characteristics such as abrasion resistance to a sealing material to be obtained; however, it is difficult to expect desired fixing prevention effects, as shown in Comparative Examples 4 to 6, provided later.

The above components are optionally mixed with a pigment, etc., and the resulting mixture is then mixed by a mixer, such as a Henschel mixer or a universal mixer. The mixture is premolded by holding it at a molding pressure of about 40 to 80 MPa for about 1.5 to 3 minutes, and then molded by sintering at about 360 to 380° C. for about 2 to 3 hours.

EXAMPLES

The following describes the present invention with reference to Examples.

Example 1

70 volume % of a polytetrafluoroethylene resin (Teflon <registered trademark> 7-J, produced by Du Pont-Mitsui Fluorochemicals Co., Ltd.; specific gravity: 2.14 to 2.18) and 30 volume % of coke having an average particle diameter of 48 μm (AT-No. 5C, produced by Oriental Industry Co., Ltd.; specific gravity: 1.9 to 2.1) were mixed by a Henschel mixer. The resulting mixture was maintained at a molding pressure of 69 MPa for 2 minutes using a compression molding apparatus, and then premolded into a rectangular shape (4×4×8 mm), followed by sintering at 375° C. for 3 hours, thereby producing a test piece.

The resulting test piece was cut into two equal parts in the long axis direction using a razor. The cut cross-sections of the two cubes (4×4×4 mm) were fixed to each other in a dry air environment at a surface pressure of 7 MPa at a temperature of 160° C. for 1 hour. Then, the two cubes were pulled with an autograph, and the stress at which the two cubes were peeled off from each other was measured as the fixing stress. The result was 0.15 MPa, which was evaluated as ○. Here, a case where the fixing stress was less than 0.25 MPa was evaluated as ○, and a case where the fixing stress was 0.25 MPa or more was evaluated as ×.

Example 2

In Example 1, the amount of polytetrafluoroethylene resin was changed to 75 volume %, and that of coke was changed to 25 volume %. As a result, the fixing stress was 0.18 MPa (evaluation: ○).

Comparative Example 1

In Example 1, the amount of polytetrafluoroethylene resin was changed to 80 volume %, and that of coke was changed to 20 volume %. As a result, the fixing stress was 0.29 MPa (evaluation: ×).

Comparative Example 2

In Example 1, the amount of polytetrafluoroethylene resin was changed to 85 volume %, and that of coke was changed to 15 volume %. As a result, the fixing stress was 0.47 MPa (evaluation: ×).

Comparative Example 3

In Example 1, the amount of polytetrafluoroethylene resin was changed to 90 volume %, and that of coke was changed to 10 volume %. As a result, the fixing stress was 0.52 MPa (evaluation: ×).

Comparative Example 4

In Example 1, the same amount (30 volume %) of carbon fiber (fiber diameter: 10 μm, fiber length: 70 μm, specific gravity: 1.6) was used in place of the coke. As a result, the fixing stress was 0.45 MPa (evaluation: ×).

Comparative Example 5

In Example 1, the same amount (30 volume %) of glass fiber (fiber diameter: 10 μm, fiber length: 30 μm, specific gravity: 2.54) was used in place of the coke. As a result, the fixing stress was 0.40 MPa (evaluation: ×).

Comparative Example 6

In Comparative Example 5, the amount of polytetrafluoroethylene resin was changed to 90 volume %, and that of glass fiber was changed to 10 volume %. As a result, the fixing stress was 0.72 MPa (evaluation: ×).

Comparative Example 7

In Example 1, the same amount (30 volume %) of coke having an average particle diameter of 35 μm was used as the coke. As a result, the fixing stress was 0.28 MPa (evaluation: ×).

Comparative Example 8

In Comparative Example 7, the amount of polytetrafluoroethylene resin was changed to 90 volume %, and that of coke was changed to 10 volume %. As a result, the fixing stress was 0.74 MPa (evaluation: ×).

Comparative Example 9

In Example 1, the same amount (30 volume %) of spherical bronze having an average particle diameter of 30 μm was used in place of the coke. As a result, the fixing stress was 0.33 MPa (evaluation: ×).

Comparative Example 10

In Example 1, the same amount (30 volume %) of spherical bronze having an average particle diameter of 96 μm was used in place of the coke. As a result, the fixing stress was 0.27 MPa (evaluation: ×).

Example 3

In Example 1, the same amount (30 volume %) of amorphous bronze having an average particle diameter of 75 μm was used in place of the coke. As a result, the fixing stress was 0.17 MPa (evaluation: ○).

Comparative Example 11

In Example 1, the same amount (30 volume %) of amorphous bronze having an average particle diameter of 43 μm was used in place of the coke. As a result, the fixing stress was 0.37 MPa (evaluation: ×).

Example 4

In Example 1, the same amount (30 volume %) of porous bronze having an average particle diameter of 50 μm was used in place of the coke. As a result, the fixing stress was 0.14 MPa (evaluation: ○)

Comparative Example 12

In Example 1, the same amount (30 volume %) of porous bronze having an average particle diameter of 35 μm was used in place of the coke. As a result, the fixing stress was 0.34 MPa (evaluation: ×).

The invention claimed is:
1. A polytetrafluoroethylene resin composition comprising 67 to 75 volume % of a polytetrafluoroethylene resin and 33 to 25 volume % of a filler having an average particle diameter of 45 to 80 μm and an aspect ratio of 1 to 2.
2. The polytetrafluoroethylene resin composition according to claim 1, wherein the polytetrafluoroethylene resin is used in an amount of 69 to 72 volume %, and the filler is used in an amount of 31 to 28 volume %.
3. The polytetrafluoroethylene resin composition according to claim 1, wherein the filler is a coke powder or a bronze powder.

4. The polytetrafluoroethylene resin composition according to claim 1, wherein the filler has an average particle diameter of 50 to 75 μm.

5. An oil seal ring produced from the polytetrafluoroethylene resin composition according to claim 1.

6. The oil seal ring according to claim 5, which is used as a sealing material applied to a vehicle stepless transmission or power steering device.

7. An oil seal ring produced from the polytetrafluoroethylene resin composition according to claim 2.

8. The oil seal ring according to claim 7, which is used as a sealing material applied to a vehicle stepless transmission or power steering device.

* * * * *